United States Patent
Zhang et al.

(10) Patent No.: US 9,941,982 B2
(45) Date of Patent: Apr. 10, 2018

(54) METHOD AND APPARATUS FOR TESTING THE BEAMFORMING PERFORMANCE OF A WIRELESS COMMUNICATION DEVICE

(71) Applicant: Marvell World Trade Ltd., St. Michael (BB)

(72) Inventors: Hongyuan Zhang, Fremont, CA (US); Sudhir Srinivasa, Campbell, CA (US); Xiayu Zheng, San Jose, CA (US); Rohit U. Nabar, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 614 days.

(21) Appl. No.: 14/242,678

(22) Filed: Apr. 1, 2014

(65) Prior Publication Data

US 2014/0307568 A1 Oct. 16, 2014

Related U.S. Application Data

(60) Provisional application No. 61/810,547, filed on Apr. 10, 2013.

(51) Int. Cl.
*H04B 17/391* (2015.01)
*H04B 7/06* (2006.01)
*H04B 17/15* (2015.01)
*H04B 17/00* (2015.01)

(52) U.S. Cl.
CPC ....... *H04B 17/0037* (2013.01); *H04B 7/0689* (2013.01); *H04B 17/15* (2015.01); *H04B 17/3912* (2015.01)

(58) Field of Classification Search
CPC .. H04B 7/0689; H04B 17/15; H04B 17/0042; H04B 17/0689; H04B 17/0037; H04B 17/3912; H04W 24/08
See application file for complete search history.

(56) References Cited

U.S. PATENT DOCUMENTS

| | | | |
|---|---|---|---|
| 8,311,160 B1 | 11/2012 | Zhang | |
| 8,335,167 B1 | 12/2012 | Zhang et al. | |
| 2006/0233111 A1* | 10/2006 | Wright | H04B 17/0087 370/241 |
| 2008/0129615 A1* | 6/2008 | Breit | G01R 29/105 343/703 |

(Continued)

*Primary Examiner* — David Oveissi
*Assistant Examiner* — Fangyan Deng

(57) ABSTRACT

Systems and techniques relating to beamforming testing for wireless communication are described. A described technique includes controlling a first wireless device to deactivate or activate a beamforming mode, the first device being configured to selectively use the beamforming mode to transmit data over multiple antennas; causing the first device to send a first portion of data traffic to a second wireless device via a wireless channel while the beamforming mode is deactivated; measuring first throughput values of the first portion of data traffic while the beamforming mode is deactivated; causing the first device to send a second portion of data traffic to the second device via the wireless channel while the beamforming mode is activated; measuring second throughput values of the second portion of the data traffic while the beamforming mode is activated; and producing a test result based on a comparison of the first and second throughput values, and predetermined criteria.

23 Claims, 11 Drawing Sheets

(56) References Cited

U.S. PATENT DOCUMENTS

| | | | |
|---|---|---|---|
| 2008/0266176 A1 | 10/2008 | Nabar et al. | |
| 2009/0072843 A1* | 3/2009 | Slupsky | G01R 31/2889 324/750.01 |
| 2010/0267341 A1 | 10/2010 | Bergel et al. | |
| 2012/0281620 A1* | 11/2012 | Sampath | H04B 7/0643 370/328 |
| 2013/0322509 A1* | 12/2013 | Harel | H04B 7/0413 375/227 |
| 2013/0337862 A1* | 12/2013 | Liu | H04W 52/0206 455/522 |
| 2014/0086122 A1* | 3/2014 | Gupta | H04B 7/0632 370/311 |
| 2014/0187174 A1* | 7/2014 | Safavi | H04B 7/0413 455/73 |
| 2014/0269671 A1* | 9/2014 | Kalkunte | H04W 56/0005 370/350 |
| 2014/0269964 A1* | 9/2014 | Du | H04B 7/0452 375/267 |
| 2015/0010112 A1* | 1/2015 | Liu | H04W 24/08 375/316 |

\* cited by examiner

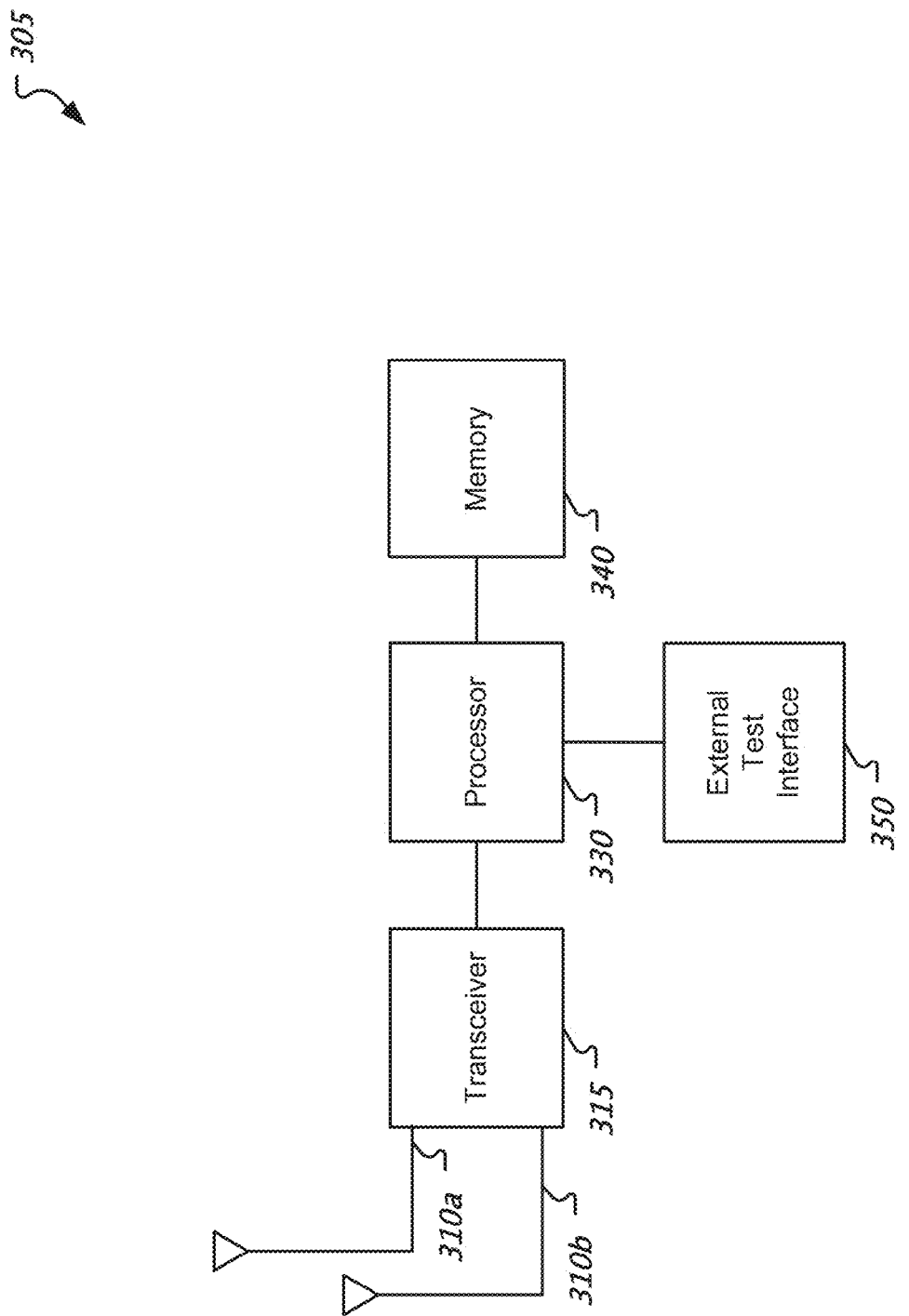

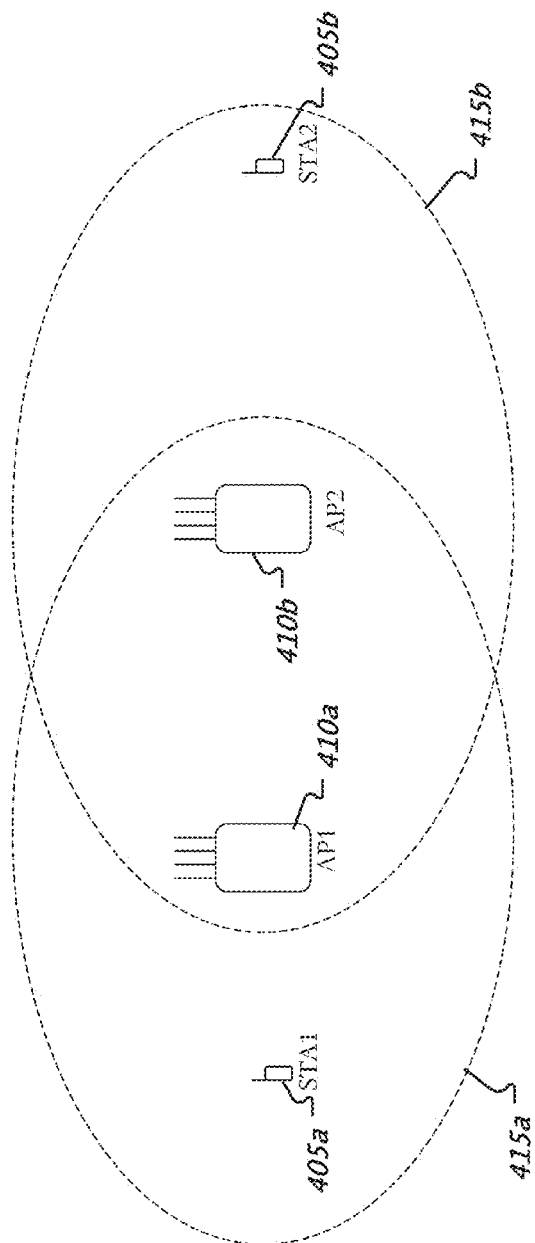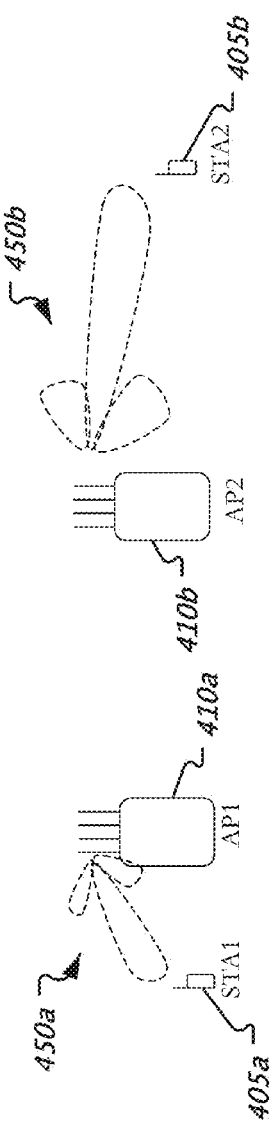
FIG. 4A
FIG. 4B

METHOD AND APPARATUS FOR TESTING THE BEAMFORMING PERFORMANCE OF A WIRELESS COMMUNICATION DEVICE

CROSS REFERENCE TO RELATED APPLICATIONS

This disclosure claims the benefit of the priority of U.S. Provisional Application Ser. No. 61/810,547 filed Apr. 10, 2013, and entitled "TxBF Test Methodology". The above-identified application is incorporated herein by reference in its entirety.

BACKGROUND

Wireless communication systems such as cellular networks or wireless local area networks (WLANs) include multiple wireless communication devices that communicate over wireless channels. When operating in an infrastructure mode, a wireless communication device called an access point (AP) provides other wireless communication devices, referred to as client stations (STAs), connectivity with a network such as the Internet. Various examples of wireless communication devices include mobile phones, smart phones, wireless routers, wireless hubs. In some cases, wireless communication electronics are integrated with data processing equipment such as laptops, personal digital assistants, and computers.

Wireless communication systems can use one or more wireless communication technologies such as orthogonal frequency division multiplexing (OFDM) or code division multiple access (CDMA). In an OFDM based wireless communication system, a data stream is split into multiple data substreams. Such data substreams are sent over different OFDM subcarriers, which can be referred to as tones or frequency tones. Some wireless communication systems use a single-in-single-out (SISO) communication approach, where each wireless communication device uses a single antenna. Other wireless communication systems use a multiple-in-multiple-out (MIMO) communication approach, where a wireless communication device uses multiple transmit antennas and multiple receive antennas. WLANs such as those based on an Institute of Electrical and Electronics Engineers (IEEE) wireless communications standards, e.g., 802.11a, 802.11n, 802.11ac, can use OFDM to transmit and receive signals. Moreover, WLANs, such as ones based on the IEEE 802.11n or 802.11ac standards, can use OFDM and MIMO.

When multiple antennas are available at a transmitter, the transmitter can use a MIMO technique called beamforming to apply efficient beam patterns to the antennas to better exploit spatial selectivity and improve aggregate communication throughput. Beamforming creates a spatial gain pattern having one or more high gain lobes or beams, as compared to the gain obtained by a single omni-directional antenna, in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission. In addition to providing better link reliability, beamforming can greatly reduce the amount of power dissipated by transmitting devices. More specifically, beamforming allows a transmitting device to focus the transmission power in a particular direction when transmitting data to one or several receiving devices.

SUMMARY

The present disclosure includes systems and techniques related to beamforming testing for wireless communication. According to an aspect of the described systems and techniques, a described technique includes controlling a first wireless device to deactivate, activate, or both, a beamforming mode, the first wireless device being configured to selectively use the beamforming mode to transmit data over multiple antennas; causing the first wireless device to send a first portion of data traffic to a second wireless device via a wireless channel while the beamforming mode is deactivated; measuring first throughput values of the first portion of data traffic while the beamforming mode is deactivated; causing the first wireless device to send a second portion of data traffic to the second wireless device via the wireless channel while the beamforming mode is activated; measuring second throughput values of the second portion of the data traffic while the beamforming mode is activated; and producing a test result based on a comparison of the first throughput values, the second throughput values, and one or more predetermined criteria These and other implementations can include one or more of the following features. Implementations can include rotating, at a predetermined speed, the first wireless device with respect to the second wireless device. Implementations can include measuring, at the second wireless device, one or more first receive power levels during the first portion of the data traffic while the beamforming mode is deactivated; and measuring, at the second wireless device, one or more second receive power levels during the second portion of the data traffic while the beamforming mode is activated, where the test result is based on the one or more first receive power levels and the one or more second receive power levels.

Implementations can include emulating the wireless channel between the first wireless device and the second wireless device, where the first wireless device and the second wireless device are communicatively coupled via a channel emulator by one or more cables; and adjusting a channel phase of the emulated wireless channel to change a throughput of the first portion of the data traffic to produce an adjusted channel phase. The first throughput values and the second throughput values can be measured while the wireless channel is emulated at the adjusted channel phase. In some implementations, adjusting the channel phase can include changing the channel phase to minimize throughput, and producing the test result can include determining whether the second throughput values represent a gain over the first throughput values by at least an amount specified by a predetermined criterion of the one or more predetermined criteria. In some implementations, adjusting the channel phase can include changing the channel phase to maximize throughput, and where producing the test result can include determining whether a difference between the first throughput values and the second throughput values satisfies a predetermined criterion of the one or more predetermined criteria.

Implementations can include controlling, during a testing period, the first wireless device to operate at a fixed transmit rate; rotating, at a predetermined speed during the testing period, the second wireless device with respect to the first wireless device; and controlling, during the testing period, a distance between the first wireless device and the second wireless device to produce a plurality of predetermined distances. Measuring the first throughput values can include measuring one or more throughput values at each of the predetermined distances. Measuring the second throughput values can include measuring one or more throughput values at each of the predetermined distances. Producing the test result can include determining whether the second throughput values represent a gain over the first throughput values by at least an amount specified by a predetermined criterion of the one or more predetermined criteria for at least one complete revolution at each of the predetermined distances.

Implementations can include rotating, at the predetermined speed during the testing period, a third wireless device with respect to the first wireless device, where the first portion of the data traffic can include one or more packets addressed to the second wireless device and one or more packets addressed to the third wireless device, where the second portion of the data traffic can include one or more packets addressed to the second wireless device and one or more packets addressed to the third wireless device, where the first throughput values can include values associated with the second wireless device and values associated with the third wireless device, and where the second throughput values can include values associated with the second wireless device and values associated with the third wireless device.

In some implementations, rotating the second wireless device and rotating the third wireless device can include operating a single turn-table to rotate the second wireless device and the third wireless device at the predetermined speed. In some implementations, the second wireless device is configured to use a single antenna to receive the data traffic, and the third wireless device is configured to use multiple antennas to receive at least a portion of the data traffic. In some implementations, the second wireless device is configured to use multiple antennas to receive at least a portion of the data traffic. Implementations can include detecting whether one or more beamforming feedback frames are transmitted from the second wireless device, where the test result is based on an outcome of the detecting.

Implementations can include controlling the first wireless device to operate at a fixed transmit rate; measuring, at the first wireless device, first transmit power values of the first portion of data traffic while the beamforming mode is deactivated and the first wireless device is operating at the fixed transmit rate; measuring, at the first wireless device, second transmit power values of the second portion of data traffic while the beamforming mode is activated and the first wireless device is operating at the fixed transmit rate; and producing a test result based on a comparison of the first transmit power values and the second transmit power values. Implementations can include controlling the first wireless device to operate at a fixed transmit rate; increasing, while the beamforming mode is deactivated and from a starting point, a distance between the first wireless device and the second wireless device until a throughput of the first portion of the data traffic is decreased by at least a predetermined amount to produce a first distance; and increasing, while the beamforming mode is activated and from the starting point, a distance between the first wireless device and the second wireless device until a throughput of the second portion of the data traffic is decreased by at least a predetermined amount to produce a second distance. Producing the test result can include determining a difference between the second distance and the first distance.

Implementations can include controlling a third wireless device to deactivate, activate, or both, the beamforming mode, the third wireless device configured to selectively use the beamforming mode to transmit data over multiple antennas, where the data traffic is first data traffic; causing the third wireless device to send a first portion of second data traffic to a forth wireless device while the beamforming mode is deactivated, the first portion of the second data traffic overlapping in time with the first portion of the first data traffic; measuring third throughput values of the first portion of the second data traffic while the beamforming mode is deactivated; causing the third wireless device to send a second portion of the second data traffic to the forth wireless device while the beamforming mode is activated, the second portion of the second data traffic overlapping in time with the second portion of the first data traffic; and measuring forth throughput values of the second portion of the second data traffic while the beamforming mode is activated. Producing the test result can include detecting an increase in aggregate throughput based on a comparison of the first throughput values, the second throughput values, the third throughput values, and the forth throughput values.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

A test system can include circuitry configured to control a first wireless device to deactivate, active, or both a beamforming mode, the first wireless device configured to selectively use the beamforming mode to transmit data over multiple antennas; circuitry configured to cause the first wireless device to send a first portion of data traffic to a second wireless device via a wireless channel while the beamforming mode is deactivated, cause the first wireless device to send a second portion of data traffic to the second wireless device via the wireless channel while the beamforming mode is activated; circuitry configured to measure first throughput values of the first portion of data traffic while the beamforming mode is deactivated, and measure second throughput values of the second portion of the data traffic while the beamforming mode is activated; and circuitry configured to produce a test result based on a comparison of the first throughput values, the second throughput values, and one or more predetermined criteria.

Details of one or more implementations are set forth in the accompanying drawings and the description below. Other features and advantages may be apparent from the description and drawings, and from the claims.

DRAWING DESCRIPTIONS

FIG. 3 shows a simplified architecture for an example of a wireless communication device.

FIGS. 4A and 4B show examples of signal patterns when a beamforming mode is disabled and enable, respectively.

Like reference symbols in the various drawings indicate like elements.

DETAILED DESCRIPTION

Figure 1:
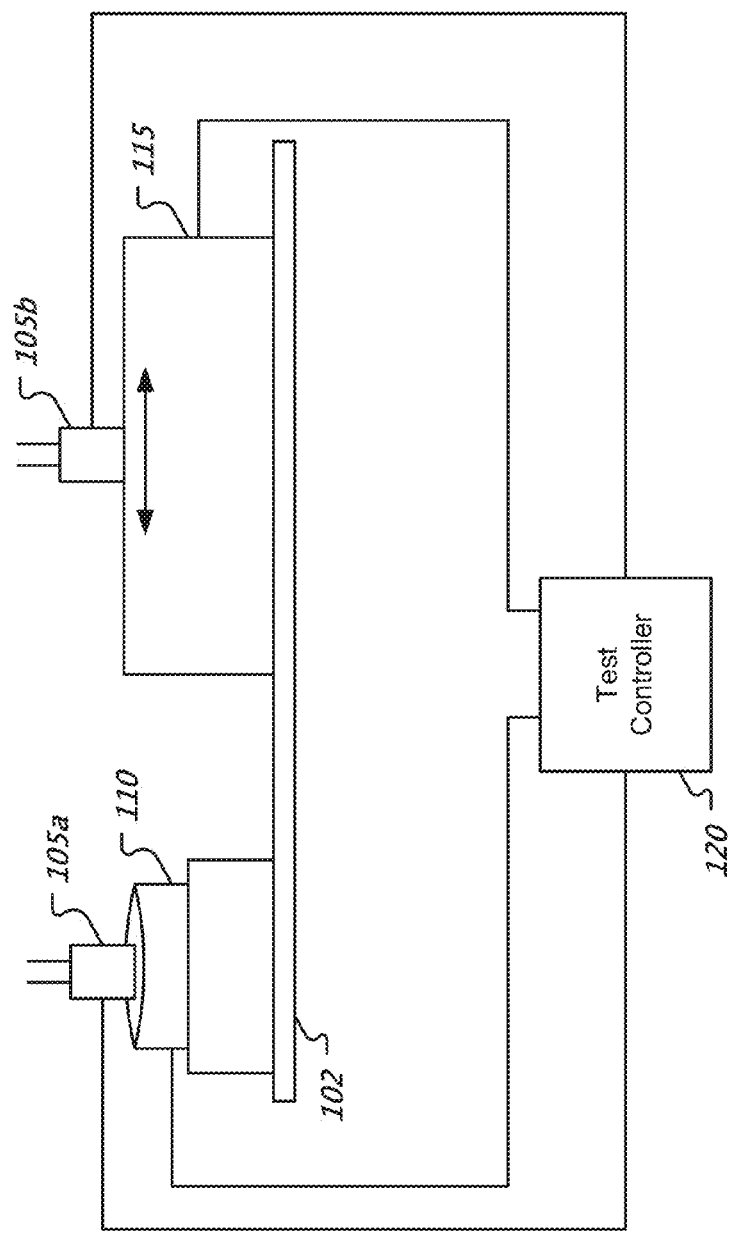
FIG. 1 shows a diagram for an example of a beamforming test system.

FIG. 1 shows a diagram for an example of a beamforming test system 101. The system 101 can include a turn-table 110, platform 115, fixed surface 102, wireless devices 105a-b, and a test controller 120. Various examples of devices 105a-b includes access points (AP), client devices (STA), or dual-mode devices that are capable of being both an AP and STA. One of the devices 105a can be a device under test (DUT), while the other device 105b can serve to receive signals from the DUT, device 105a. The test controller 120 can be configured to cause device 105a to send data traffic to device 105b. Various examples of data traffic include Transmission Control Protocol (TCP) based packets or User Datagram Protocol (UDP) based packets. Other types of data traffic are possible. In some implementations, the test controller 120 can forward data packets to the DUT, device 105a, such that device 105a routes the packets to device 105b.

DUT, device 105a is configured to support a beamforming mode for data transmission to device 105b. Further, device 105a is configured to turn on or off beamforming in accordance with a command from the test controller 120. In this way, the test controller 120 can measure values such as throughput and reception power level values while beamforming is on and while beamforming is off. The test controller 120 can control the DUT, device 105a to deactivate, activate, or both, a beamforming mode. For example, the test controller 120 can control the DUT, device 105a to deactivate the beamforming mode during a beamforming off-part of a test, and control the DUT, device 105a to activate the beamforming mode during a beamforming on-part of the test.

In some implementations, the test controller 120 can be coupled to a signal analyzer such as a visual signal analyzer (VSA) or an automated signal analyzer, which is coupled to at least one of the antennas of device 105b, to measure reception power level values. In some implementations, device 105b can report throughput values via a test interface. In some implementations, device 105b can report throughput values via a test program running on the device 105b, which is configured to receive the data traffic from the DUT, device 105a.

To measure test values such as throughput and reception power level at different angular positions between the devices 105a-b, the test controller 120 can cause the turn-table 110 to rotate at a predetermined speed, such as one revolution per minute (RPM), which in turn causes device 105a to rotate. To measure test values at different distances between the devices 105a-b, the test controller 120 can cause the platform 115 to move device 105b, e.g., closer to device 105a or away from device 105a. In some implementations, the platform 115 includes a conveyor belt to move objects such as device 105a. In some implementations, the platform 115 includes a robotic arm to move objects. Thus, the test controller 120 can take measurements at different relative angular positions, distances, or both.

In some implementations, the test controller 120 can include a processor configured to perform one or more beamforming tests as described herein. In some implementations, the test controller 120 includes circuitry to record measurement data such as throughput or power level values. In some implementations, the test controller 120 includes a data traffic generator to generate and forward packets to a DUT. In some implementations, the test controller 120 is manually operated by a person. In some test cases, a DUT can be located on platform 115, and the turn-table 110 can support a device to receive signals from the DUT. In some test cases, a DUT can be located on platform 115, and the turn-table 110 can support, at the same time, two or more devices to receive signals from the DUT, where the two or more devices are separated by a predetermined distance.

Figure 2:
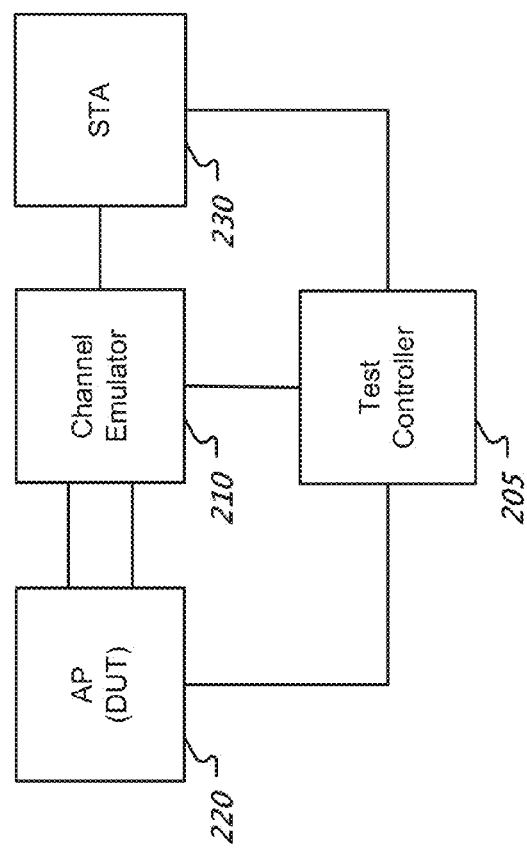
FIG. 2 shows a diagram for an example of a beamforming test system that includes a wireless channel emulator.

FIG. 2 shows a diagram for an example of a beamforming test system 201 that includes a wireless channel emulator 210. The system 201 is configured to test a DUT, which is AP 220 in this example. AP 220 is configured to support a beamforming mode for data transmission to STA 230. The system 201 includes a channel emulator 210, which is coupled with the AP 220 via one or more cables, and coupled with the STA 230 via one or more cables. A test controller 205 can adjust a phase of a wireless channel being emulated by the channel emulator 210. The test controller 205 can measure throughput values of data traffic from the AP 220 to the STA 230 as it adjusts the phase, while a beamforming mode is deactivated at the AP 220 and while the beamforming mode is activated at the AP 220. The test controller 205 can produce a test result based on these throughput values to indicate how well the AP 220 has implemented beamforming.

FIG. 3 shows a simplified architecture for an example of a wireless communication device 305. The device 305 includes one or more antennas 310a-b, transceiver 315, processor 330, and memory 340. In some implementations, the device 305 is configured as an AP and is configured to support beamforming over multiple antennas 310a-b. In some implementations, the device 305 is configured as a client device. The processor 330 can include one or more processor cores. The device 305 can include one or more memories 340 configured to store information such as data, instructions, or both. The transceiver 315 includes transmit and receive chain circuitry. The processor 330 can include a multi-core processor. In some implementations, the processor can include a digital signal processor (DSP), a field-programmable gate array (FPGA), a general-propose processor, or a combination thereof. In some implementations, the transceiver 315 includes integrated transmitting and receiving circuitry. In some implementations, the device 305 includes dedicated circuitry for transmitting and dedicated circuitry for receiving. In some implementations, the device 305 can use a DSP to produce signal patterns via the antennas 310*a-b* in a beamforming mode.

The device 305 can include an external test interface 350, such as a Joint Test Action Group (JTAG) interface, Universal Serial Bus (USB), or one or more general purpose input/output (GPIO) pins. Memory 340 can store firmware for the device 305, where the firmware includes one or more test procedures, and a test command interface. For example, a test controller, such as controller 120 or controller 205, can send commands to the device 305 via the external test interface 350. Such commands can include a beamforming disable command, beamforming enable command, fixed transmit rate enable command, and a fixed transmit rate disable command.

FIGS. 4A and 4B show examples of signal patterns when a beamforming mode is disabled and enable, respectively. In these examples, APs 410*a-b* operate in the same frequency band. In FIG. 4A, the beamforming mode is disabled at both APs 410*a-b*. While the beamforming mode is off, the signal patterns 415*a-b* from respective neighboring APs 410*a-b* will overlap causing interference. This results in lower aggregate throughput to respective client devices 405*a-b*.

In FIG. 4B, the beamforming mode is enabled at both APs 410*a-b*. In the beamforming mode, the APs 410*a-b* control the phase and amplitude of a signal at each of their antennas to define an overall signal pattern 450*a-b*. For example, the APs 410*a-b* can apply spatial mapping in forming their respective transmission signals to generate one or more high gain lobes in some directions and not in others. Thus, in this example, spatial mapping can be applied such that the APs 410*a-b* generate signal patterns 450*a-b* with high gain lobes in opposite directions, as long as the client devices 405*a-b* are on opposing sides, or at least spatially separated. While the beamforming mode is on, the signal patterns 450*a-b* from respective neighboring APs 410*a-b* will not overlap. This results in a higher aggregate throughput to respective client devices 405*a-b* when compared to the aggregate throughput of FIG. 4A.

Figure 5:
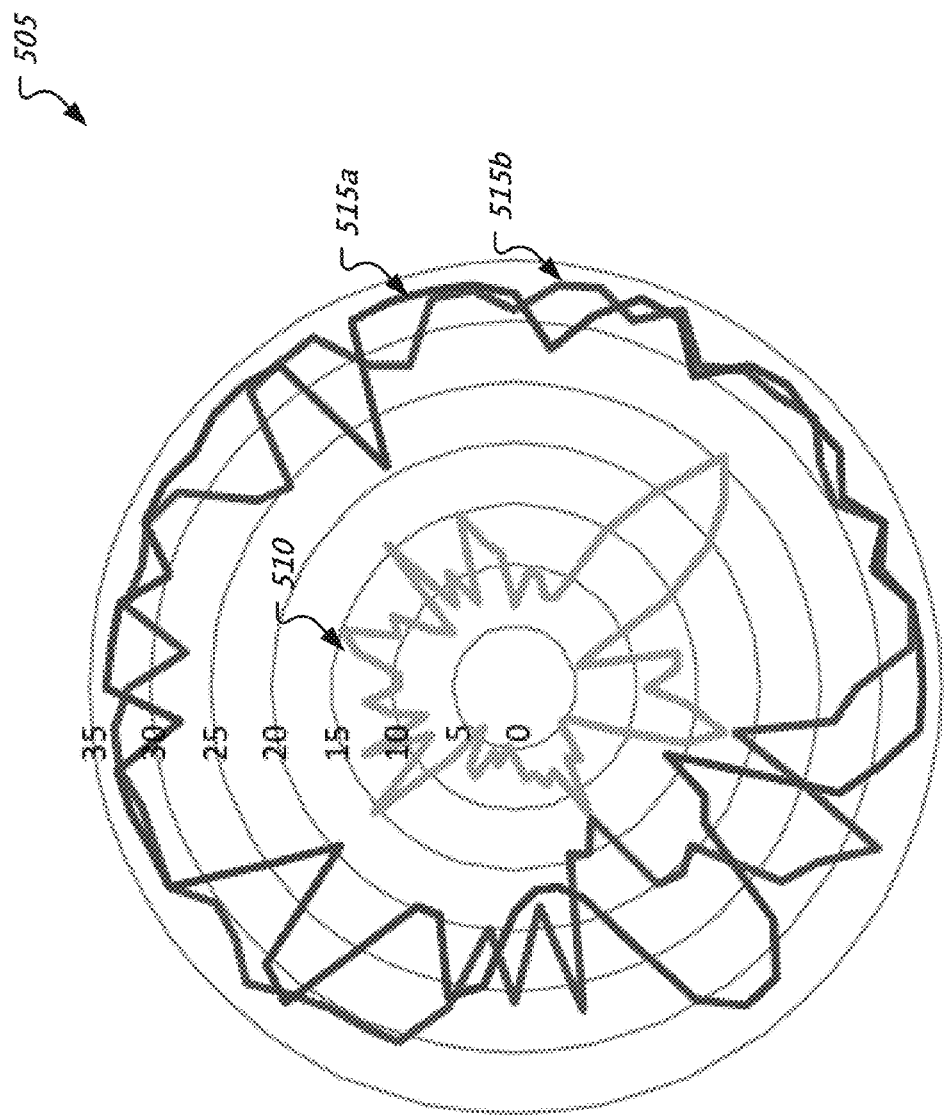
FIG. 5 shows a circular chart for an example of beamforming on/off power level measurements for a test.

FIG. 5 shows a circular chart 505 for an example of beamforming on/off power level measurements for a test. Power level measurements are recorded for at least one complete revolution, such as a complete revolution of turntable 110 in FIG. 1, for each part of the test, e.g., beamforming on-part and beamforming off-part. A first plot 510 on chart 505 shows power level values for relative angles between a DUT and a device that receive signals from the DUT while beamforming is off. Second plots 515*a-b* on chart 505 shows power level values for relative angles between the DUT and the device that receive signals from the DUT while beamforming is on for different beamforming signals. In some implementations, the measurements can include one or more power level values per degree of rotation. In some implementations, the measurements can include one or more power level values per N degrees of rotation, where N is greater than 1, such as 5 or 10. In some implementations, points on chart 505 represent an average of multiple values. A test controller analyzes fluctuations in power level values and compares power level values. For example, a test controller can produce a passing test result based on there being significantly less power fluctuations and larger received power across all angles for the beamforming on-part of the test when compared to the beamforming off-part of the test. In some implementations, the test controller can generate and display the circular chart 505 to a test operator. In some implementations, the test controller can generate and display a circular chart similar to chart 505 to the test operator, but with throughput values instead of power level values. Note that power and/or throughput difference can depend on the number of antennas on the DUT and also on the underlying wireless channel.

Figure 6:
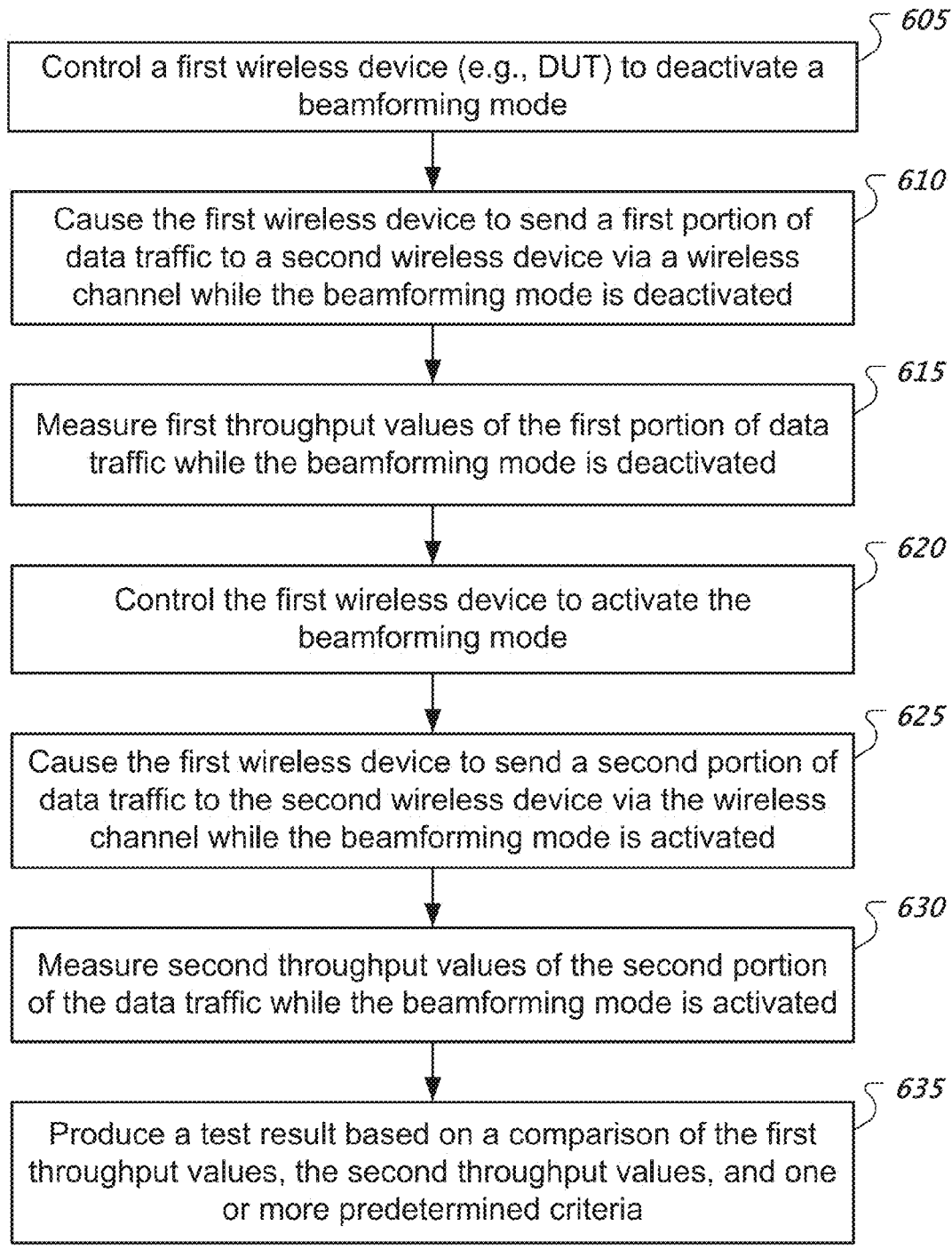
FIG. 6 shows a flowchart for an example of a beamforming measurement process.

FIG. 6 shows a flowchart for an example of a beamforming measurement process. At 605, the process includes controlling a first wireless device, which is the DUT, to deactivate a beamforming mode. The first wireless device can be configured to selectively use the beamforming mode to transmit data over multiple antennas. In some implementations, the process can send a command to deactivate the beamforming mode, where if the mode is already deactivated, the mode would remain deactivated. At 610, the process includes causing the first wireless device to send a first portion of data traffic to a second wireless device via a wireless channel while the beamforming mode is deactivated. Causing the first wireless device to send the first portion can include forwarding data packets from a test controller to the first wireless device. In some implementations, the second wireless device can include two or more antennas configured to receive wireless signals. In some implementations, the second wireless device can include a single antenna configured to receive wireless signals. At 615, the process includes measuring first throughput values of the first portion of data traffic while the beamforming mode is deactivated. In some implementations, measuring throughput values can include sniffing packet traffic between the devices. In some implementations, measuring throughput values can include accessing packet reception timestamps and packet size values, and deriving an average throughput value. In some implementations, measuring throughput values can include receiving TCP acknowledgement data, and deriving an average throughput value. In some implementations, an average throughput value can be based on measurement data collected during at least a one minute duration of data traffic.

At 620, the process includes controlling the first wireless device to activate the beamforming mode. At 625, the process includes causing the first wireless device to send a second portion of data traffic to the second wireless device via the wireless channel while the beamforming mode is activated. In some implementations, causing the first wireless device to send the second portion of data traffic is a continuation of step 610, e.g., while separated in time, both portions are a part of a same data stream, but occurring in different time periods. At 630, the process includes measuring second throughput values of the second portion of the data traffic while the beamforming mode is activated. At 635, the process includes producing a test result based on a comparison of the first throughput values, the second throughput values, and one or more predetermined criteria. In some implementations, a test result indicates a pass of the second throughput values are greater than the first throughput values by at least a predetermined amount.

The beamforming measurement process of FIG. 6 can include rotating, at a predetermined speed, the first wireless device with respect to the second wireless device in a rotational test case. The process can include measuring, at the second wireless device, one or more "off" receive power levels during the first portion of the data traffic while the beamforming mode is deactivated. The process can include measuring, at the second wireless device, one or more "on" receive power levels during the second portion of the data traffic while the beamforming mode is activated. The process can produce, in the rotational test case, a power level test result that is based on the one or more "on" receive power levels and the one or more "off" receive power levels. In some implementations, the power level test result indicates a pass if (a) the "on" receive power levels show significantly less power fluctuations across all measured angles than the "off" receive power levels and (b) the "on" receive power levels show a larger received power across all measured angles than the "off" receive power levels.

The beamforming measurement process of FIG. 6 can include controlling, during a testing period, the first wireless device to operate at a fixed transmit rate in a fixed rate non-rotational test case. The process, for example, can send a command that specifies a Modulation and Coding Scheme (MCS) index, whereby the command controls the device to use the transmit rate that corresponds to the MCS index until commanded otherwise. For the fixed rate non-rotational test case, the process can include measuring, at the first wireless device, "off" transmit power values of the first portion of data traffic while the beamforming mode is deactivated, and measuring, at the first wireless device, "on" transmit power values of the second portion of data traffic while the beamforming mode is activated. The process can produce a power level test result for the fixed rate non-rotational test case, the result being based on comparing the "on" transmit power values to the "off" transmit power values. In some implementations, the power level test result can indicate a pass if an average of the "on" transmit power values is equal to or substantially equal to an average of the "off" transmit power values, e.g., to within 5% or less.

The beamforming measurement process of FIG. 6 can include controlling the first wireless device to operate at a fixed transmit rate in a fixed rate non-rotational multi-range test case. The process can include increasing, while the beamforming mode is deactivated and from a starting point, a distance between the first wireless device and the second wireless device until a throughput of the first portion of the data traffic is decreased by at least a predetermined amount, such as by half, and recording a distance D1 that corresponds to said decrease. The starting point can be a predetermined number of meters, such as 5 meters. In some implementations, said throughput decrease can be a drop from 100 Mbps to less than 50 Mbps. The process can include increasing, while the beamforming mode is activated and from the starting point, a distance between the first wireless device and the second wireless device until a throughput of the second portion of the data traffic is decreased by at least a predetermined amount, such as by half, and recording a distance D2 that corresponds to said decrease. The process can produce a test result for the fixed rate non-rotational multi-range test case, where the test result indicates a pass based on D2−D1>M, where M is a predetermined value that is greater than zero. The value of M can be based on one or more factors such as the test environment, and the fixed rate and/or transmission power used at the DUT.

Figure 7:
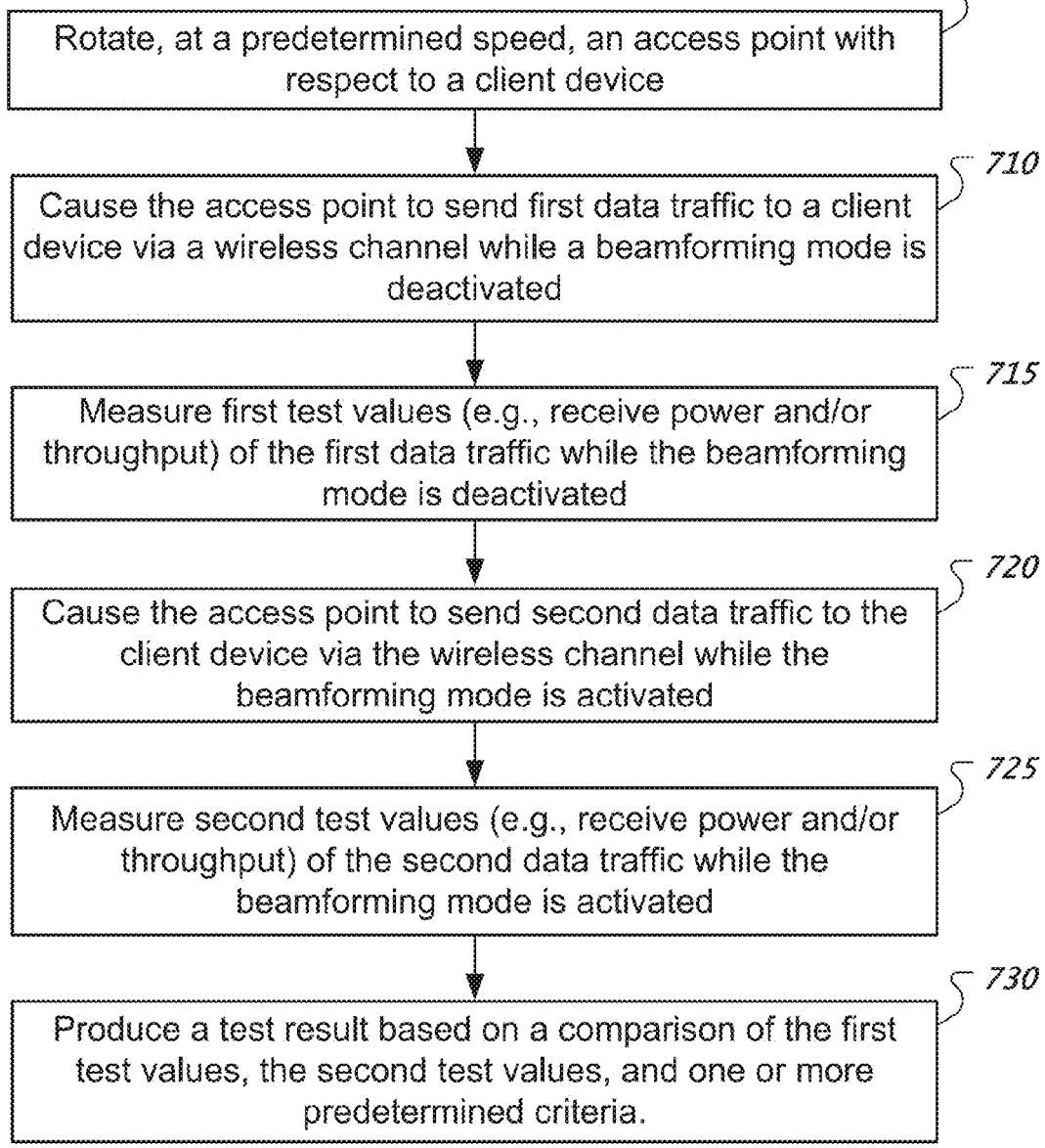
FIG. 7 shows a flowchart for an example of a beamforming measurement process that includes rotating an access point.

FIG. 7 shows a flowchart for an example of a beamforming measurement process that includes rotating an access point. At 705, the process includes rotating, at a predetermined speed, the access point with respect to a client device. The access point is configured to selectively use a beamforming mode to transmit data over multiple antennas. The client device can be configured to receive wireless signals over at least one antenna. In some implementations, the predetermined speed is one RPM. At 710, the process includes causing the access point to send first data traffic to a client device via a wireless channel while a beamforming mode is deactivated. Causing the access point to send first data traffic can include operating a test controller to forward TCP traffic to the access point, which in turn forwards the TCP traffic to the client device. The access point can be configured to use an IEEE 802.11 auto rate feature. The process can include sending a command to the access point to deactivate beamforming. At 715, the process includes measuring first test values of the first data traffic while the beamforming mode is deactivated. The first test values can include receive power values, throughput values, or both. The process can record the first test values and corresponding angular measurements of the access point. Angular measurements can include an angle value representing a degree of rotation of the access point relative to the client device at the time a corresponding test value was measured. Measuring first test values can include measuring, at the client device, one or more first throughput values during the first data traffic while the beamforming mode is deactivated. Measuring first test values can include measuring, at the client device, one or more first receive power levels during the first data traffic while the beamforming mode is deactivated. In some implementations, a signal analyzer such as a VSA can be configured to record receive power levels via a probe attached to an antenna of the client device.

At 720, the process includes causing the access point to send second data traffic to the client device via the wireless channel while the beamforming mode is activated. In some implementations, the first and second data traffic are separate portions of a same traffic flow. At 725, the process includes measuring second test values of the second data traffic while the beamforming mode is activated. The second test values can include receive power values, throughput values, or both. Measuring second test values can include measuring, at the client device, one or more second throughput values during the second data traffic while the beamforming mode is activated. Measuring second test values can include measuring, at the client device, one or more second receive power levels during the second data traffic while the beamforming mode is activated.

At 730, the process includes producing a test result based on a comparison of the first test values, the second test values, and one or more predetermined criteria. In some implementations, the test result indicates a pass if (a) the second test values show significantly less power fluctuations across all measured angles than the first test values and (b) the second test values show a larger received power across all measured angles than the first test values.

Figure 8:
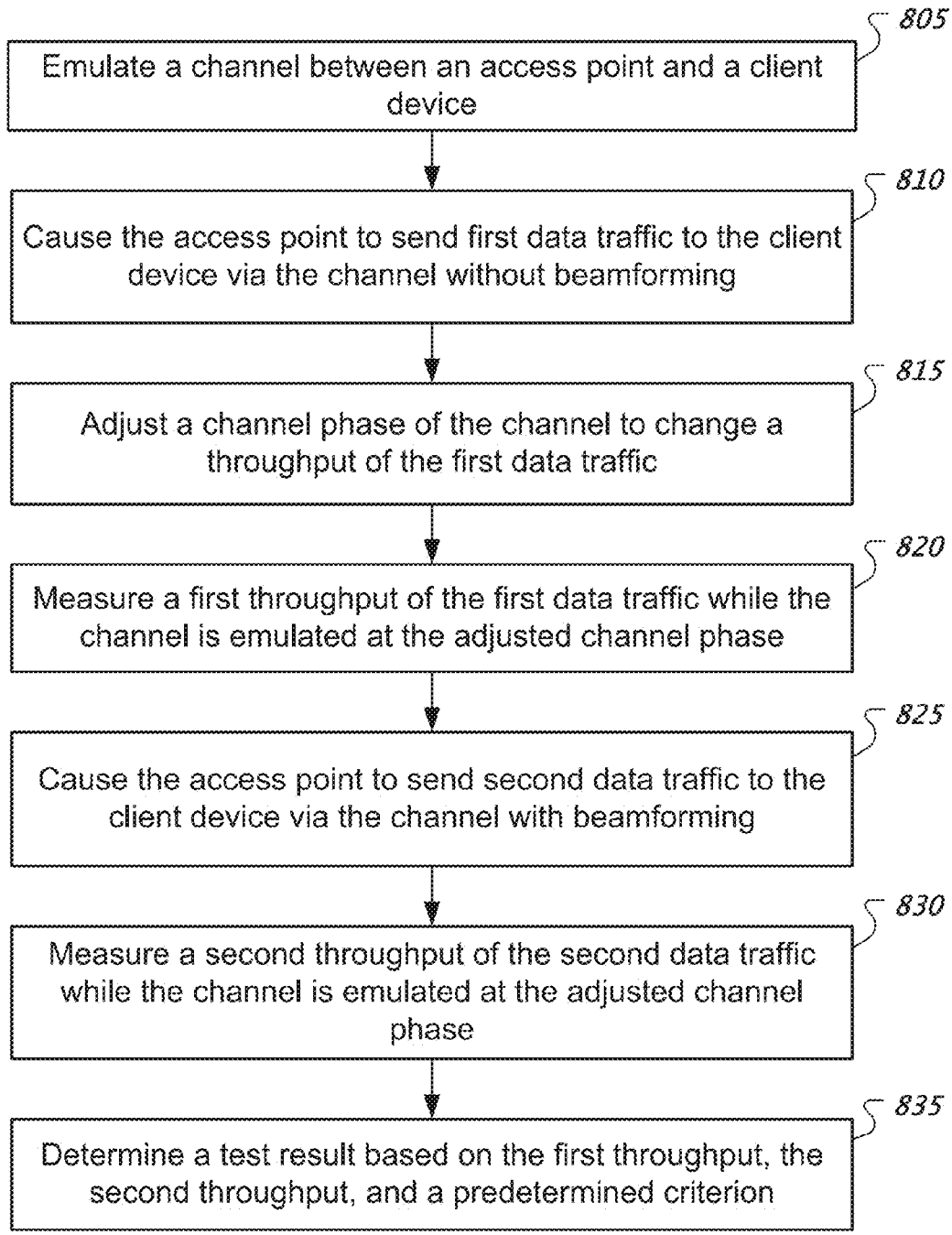
FIG. 8 shows a flowchart for an example of a beamforming measurement process using a wireless channel emulator.

FIG. 8 shows a flowchart for an example of a beamforming measurement process using a wireless channel emulator. At 805, the process includes emulating a channel between an access point and a client device. The access point is configured to selectively use a beamforming mode to transmit data over multiple antennas. The client device can be configured to receive wireless signals over at least one antenna. At 810, the process includes causing the access point to send first data traffic to the client device via the channel without beamforming. Causing the access point to send first data traffic can include controlling the access point to send TCP traffic using an IEEE 802.11 auto rate feature. At 815, the process includes adjusting a channel phase of the channel to change a throughput of the first data traffic. At 820, the process includes measuring a first throughput of the first data traffic while the channel is emulated at the adjusted channel phase. At 825, the process includes causing the access point to send second data traffic to the client device via the channel with beamforming. At 830, the process includes measuring a second throughput of the second data traffic while the channel is emulated at the adjusted channel phase. At 835, the process includes determining a test result based on the first throughput, the second throughput, and a predetermined criterion.

Adjusting the channel phase, at 815, can include changing the channel phase to minimize throughput. Determining the test result, at 835, can include determining whether the second throughput represents a gain over the first throughput by at least an amount specified by the predetermined criterion. In some implementations, the test result indicates a pass if the throughput gains at least X %. Note that X can be selected based on the test environment, channel conditions, or both.

Adjusting the channel phase, at 815, can include changing the channel phase to maximize throughput. Determining the test result, at 835, can include determining whether a difference between the first throughput and the second throughput satisfies the predetermined criterion. In some implementations, the test result indicates a pass if the throughput does not drop more than X %. Note that X can be selected based on the test environment, channel conditions, or both.

Figure 9:
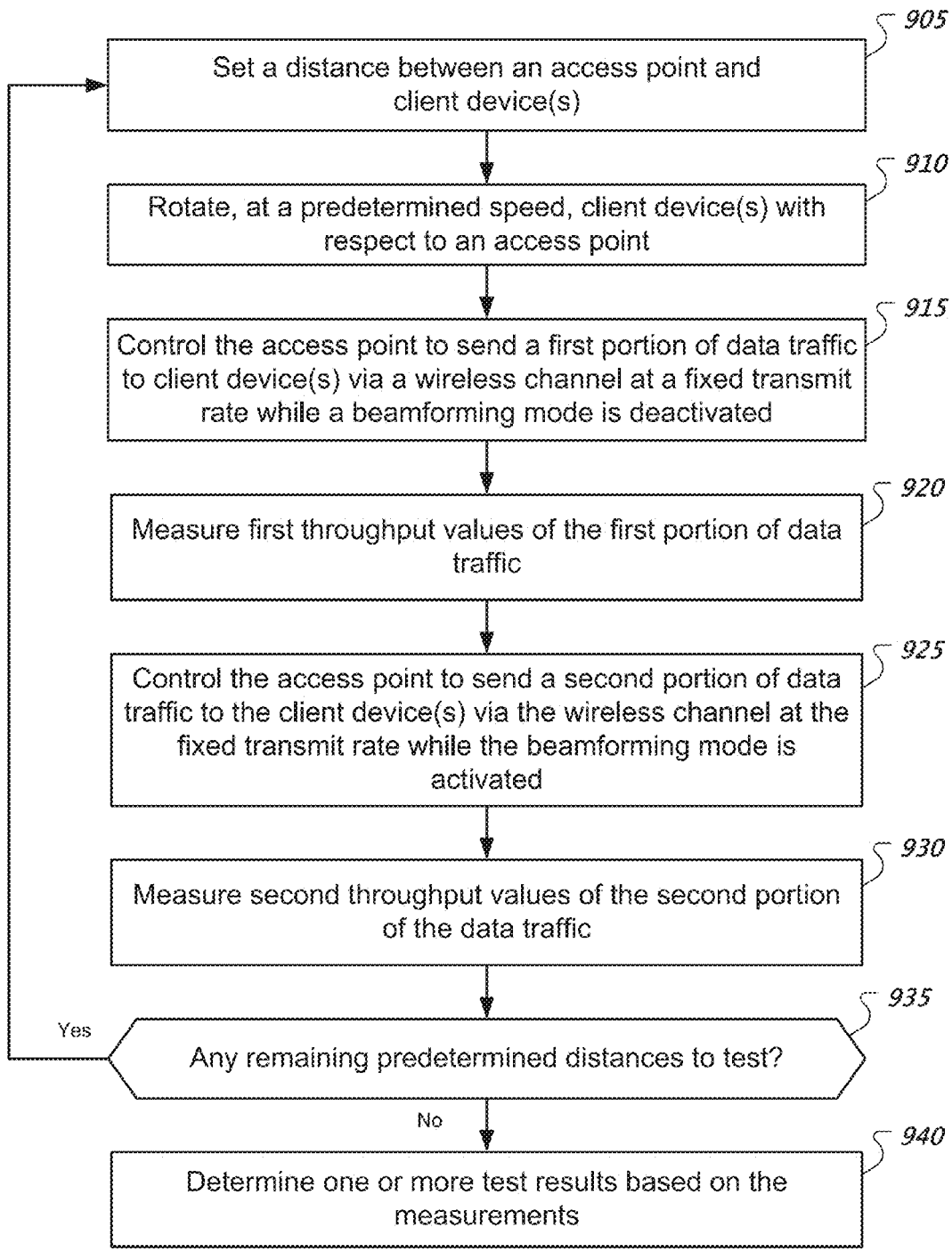
FIG. 9 shows a flowchart for an example of a beamforming measurement process for link-level over-the-air performance.

FIG. 9 shows a flowchart for an example of a beamforming measurement process for link-level over-the-air performance. At 905, the process includes setting a distance between an access point and client device(s). In some test cases, a single client device is used. In some test cases, at least two client devices are used and can be collated on the same surface, e.g., a rotatable surface of a turn-table. Setting the distance can include causing a movable platform to move a surface supporting the access point to achieve a desired distance. The distance can be set to one specified by a group of predetermined distances, such as 2 m, 10 m, 30 m, and 50 m. At 910, the process includes rotating, at a predetermined speed, the client device(s) with respect to the access point. Rotating the client device(s) with respect to the access point can include operating a turn-table to rotate the client device(s) at the predetermined speed. At 915, the process includes controlling the access point to send a first portion of data traffic to the client device(s) via a wireless channel at a fixed transmit rate while a beamforming mode is deactivated. In some implementations, the process sends a command to the access point to operate in accordance with a predetermined MCS index, such as 802.11n MCS index 8, for a duration of a test. Further, the access point and the client device can use the 802.11n 5 GHz CH36 40 MHz channel for communications within a spectrum clean indoor environment. At 920, the process includes measuring first throughput values of the first portion of data traffic. At 925, the process includes controlling the access point to send a second portion of data traffic to the client device(s) via the wireless channel at the fixed transmit rate while the beamforming mode is activated. At 930, the process includes measuring second throughput values of the second portion of the data traffic. At 935, the process determines whether there are any remaining predetermined distances to test. If there are one or more remaining distances, then the process, at 905, sets the distance between the access point and the client device to the next distance, and proceeds accordingly with the test. If there are no more distances remaining to be tested, then the process, at 940, determines one or more test results based on the measurements, such as by using a test result determination process of FIG. 10.

To test implicit beamforming, rotating the client device with respect to the access point, at 910, can include operating a turn-table to rotate two client devices at a predetermined speed. The AP's data traffic can include data packets separately addressed to each of the two client devices. One of the two devices can be configured to use a single antenna to receive the data traffic from the AP, while the other device can be configured to use multiple antennas to receive at least a portion of the data traffic from the AP. Measuring first throughput values at 920 and measuring second throughput values at 930 can include measuring throughput values for each of the two wireless devices. Determines one or more test results based on the measurements, at 940, can include determining whether there are significant throughput gains and robustness on throughput across all angles for distances greater than 10 meters for both of the devices. In some implementations, a measure of robustness is how stable the throughput is (i.e., how much the throughput/received power fluctuates).

To test explicit beamforming, rotating the client device with respect to the access point, at 910, can include operating a turn-table to rotate a single client device, where the client device is configured to use multiple antennas to receive at least a portion of the data traffic. The process can include sniffing IEEE 802.11n beamforming feedback frames such as a management action frame sent from the client device to the access point. Determines one or more test results based on the measurements, at 940, can include generating a pass result if there are significant throughput gains and robustness on throughput across all angles for distances greater than 10 meters by using the beamforming mode and a sniffer receives one or more beamforming feedback from frames from the client device.

Figure 10:
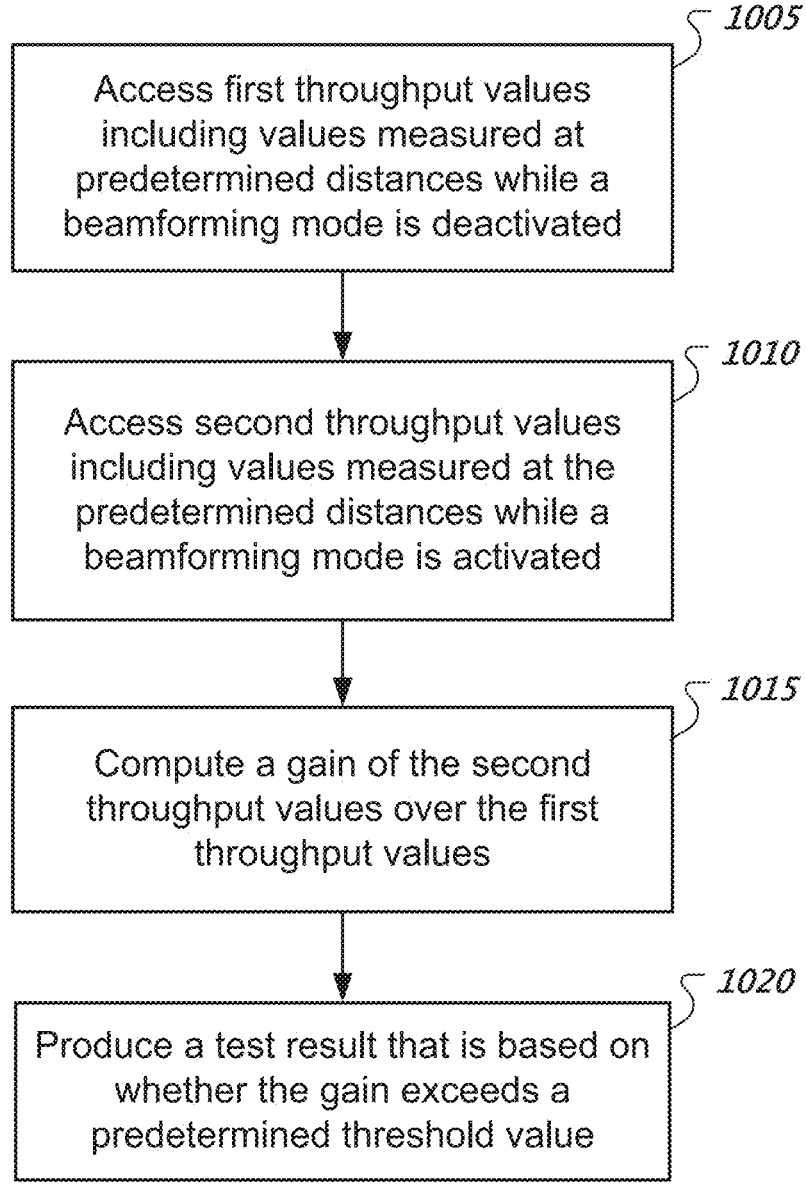
FIG. 10 shows a flowchart for an example of a test result determination process for a beamforming measurement process.

FIG. 10 shows a flowchart for an example of a test result determination process for a beamforming measurement process. At 1005, the test result determination process accesses first throughput values including values measured at predetermined distances while a beamforming mode is deactivated. At 1010, the process accesses second throughput values including values measured at the predetermined distances while a beamforming mode is activated. At 1015, the process computes a gain of the second throughput values over the first throughput values. In some implementations, the process computes a gain of an average of the second throughput values over an average of the first throughput values. At 1020, the process produces a test result that is based on whether the gain exceeds a predetermined threshold value. The test result can indicate a pass if the gain exceeds the predetermined threshold value.

Figure 11:
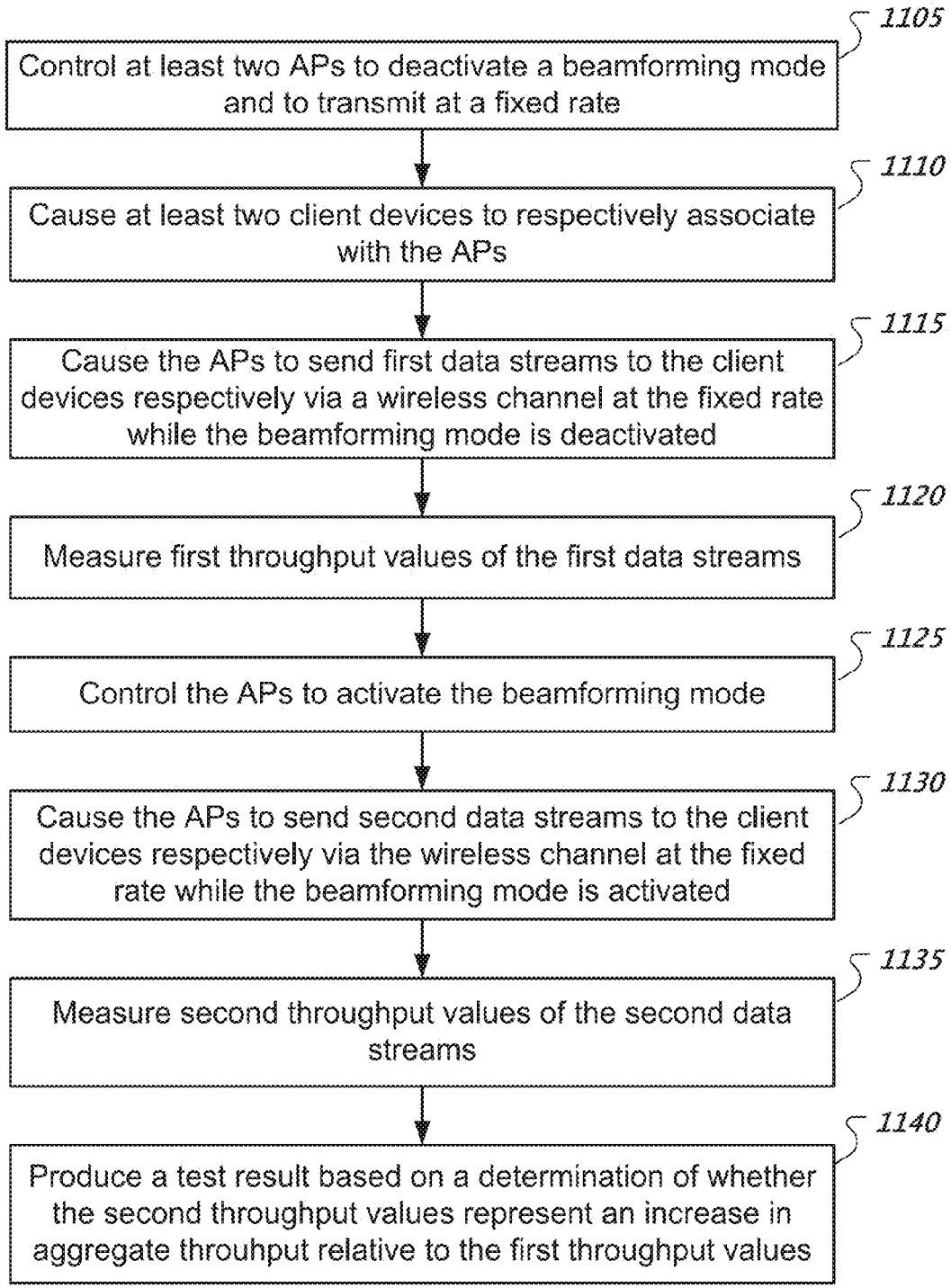
FIG. 11 shows a flowchart for an example of a beamforming interference mitigation measurement process.

FIG. 11 shows a flowchart for an example of a beamforming interference mitigation measurement process. At 1105, the process includes controlling at least two APs to deactivate a beamforming mode and to transmit at a fixed rate. At 1110, the process includes causing client devices to respectively associate with the APs. The client devices and APs can be arranged as shown by FIG. 4, i.e., they can be arranged linearly where the client devices are on opposing ends with the APs between the client devices so as to allow the APs to steer beams in opposite directions when beamforming is activated. At 1115, the process includes causing the APs to send first data streams to the client devices respectively via a wireless channel at the fixed rate while the beamforming mode is deactivated. The first data streams can include respective TCP streams. At 1120, the process includes measuring first throughput values of the first data streams. At 1125, the process includes controlling the APs to activate the beamforming mode. At 1130, the process includes causing the APs to send second data streams to the client devices respectively via the wireless channel at the fixed rate while the beamforming mode is activated. At 1135, the process includes measuring second throughput values of the second data streams. At 1140, the process includes producing a test result based on a determination of whether the second throughput values represent an increase in aggregate throughput relative to the first throughput values. Producing the test result can include determining a throughput T1 by adding averaged throughput values for both of the first data streams, determining a throughput T2 by adding averaged throughput values for both of the second data streams, and generating a pass result if T2−T1>K, where K is a predetermined value that is greater than zero.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A method comprising:
controlling a first wireless device, under a beamforming test, to deactivate, activate, or both, a beamforming mode, wherein the first wireless device is configured to selectively use the beamforming mode to transmit data over multiple antennas;
rotating, at a predetermined speed, i) the first wireless device with respect to a second wireless device or ii) the second wireless device with respect to the first wireless device;
causing the first wireless device to send a first portion of data traffic to the second wireless device via a wireless channel while the beamforming mode is deactivated;
measuring, via a single antenna of the second wireless device, first throughput values of the first portion of data traffic while the beamforming mode is deactivated;
causing the first wireless device to send a second portion of data traffic to the second wireless device via the wireless channel while the beamforming mode is activated;
measuring, via the single antenna at the second wireless device, second throughput values of the second portion of the data traffic while the beamforming mode is activated; and
producing a test result based on a comparison of (i) the first throughput values, (ii) the second throughput values, and (iii) one or more predetermined criteria, wherein the test result indicates whether the first wireless device passes or fails the beamforming test,
wherein producing the test result comprises generating a chart that depicts, per N degrees of rotation, the first throughput values and the second throughput values, wherein N is greater than 1.

2. The method of claim 1, wherein the rotating comprises:
rotating, at the predetermined speed, the first wireless device with respect to the second wireless device.

3. The method of claim 2, comprising:
measuring, at the second wireless device, one or more first receive power levels during the first portion of the data traffic while the beamforming mode is deactivated; and
measuring, at the second wireless device, one or more second receive power levels during the second portion of the data traffic while the beamforming mode is activated, wherein the test result is based on the one or more first receive power levels and the one or more second receive power levels.

4. The method of claim 1, comprising:
controlling, during a testing period, the first wireless device to operate at a fixed transmit rate,
wherein the rotating comprises rotating, at the predetermined speed during the testing period, the second wireless device with respect to the first wireless device; and
controlling, during the testing period, a distance between the first wireless device and the second wireless device to produce a plurality of predetermined distances,
wherein measuring the first throughput values comprises measuring one or more throughput values at each of the predetermined distances,
wherein measuring the second throughput values comprises measuring one or more throughput values at each of the predetermined distances, and
wherein producing the test result comprises determining whether the second throughput values represent a gain over the first throughput values by at least an amount specified by a predetermined criterion of the one or more predetermined criteria for at least one complete revolution at each of the predetermined distances.

5. The method of claim 4, comprising:
rotating, at the predetermined speed during the testing period, a third wireless device with respect to the first wireless device, wherein the first portion of the data traffic comprises one or more packets addressed to the second wireless device and one or more packets addressed to the third wireless device, wherein the second portion of the data traffic comprises one or more packets addressed to the second wireless device and one or more packets addressed to the third wireless device, wherein the first throughput values comprises values associated with the second wireless device and values associated with the third wireless device, and wherein the second throughput values comprises values associated with the second wireless device and values associated with the third wireless device.

6. The method of claim 5, wherein rotating the second wireless device and rotating the third wireless device comprises operating a single turn-table to rotate the second wireless device and the third wireless device at the predetermined speed.

7. The method of claim 5, wherein the third wireless device is configured to use multiple antennas to receive at least a portion of the data traffic.

8. The method of claim 4, wherein the second wireless device is configured to use multiple antennas to receive at least a portion of the data traffic.

9. The method of claim 8, comprising:
detecting whether one or more beamforming feedback frames are transmitted from the second wireless device, wherein the test result is based on an outcome of the detecting.

10. The method of claim 1, comprising:
controlling the first wireless device to operate at a fixed transmit rate;
measuring, at the first wireless device, first transmit power values of the first portion of data traffic while the beamforming mode is deactivated and the first wireless device is operating at the fixed transmit rate;
measuring, at the first wireless device, second transmit power values of the second portion of data traffic while the beamforming mode is activated and the first wireless device is operating at the fixed transmit rate; and
producing a test result based on a comparison of the first transmit power values and the second transmit power values.

11. The method of claim 1, comprising:
controlling the first wireless device to operate at a fixed transmit rate;
increasing, while the beamforming mode is deactivated and from a starting point, a distance between the first wireless device and the second wireless device until a throughput of the first portion of the data traffic is decreased by at least a predetermined amount to produce a first distance; and
increasing, while the beamforming mode is activated and from the starting point, the distance between the first wireless device and the second wireless device until the throughput of the second portion of the data traffic is decreased by at least a predetermined amount to produce a second distance,
wherein producing the test result comprises determining a difference between the second distance and the first distance.

12. A system comprising:
circuitry configured to control a first wireless device, under a beamforming test, to deactivate, active, or both a beamforming mode, the first wireless device configured to selectively use the beamforming mode to transmit data over multiple antennas;
circuitry configured to rotate, at a predetermined speed, i) the first wireless device with respect to a second wireless device or ii) the second wireless device with respect to the first wireless device;
circuitry configured to cause the first wireless device to send a first portion of data traffic to the second wireless device via a wireless channel while the beamforming mode is deactivated, cause the first wireless device to send a second portion of data traffic to the second wireless device via the wireless channel while the beamforming mode is activated;
circuitry configured to measure, via a single antenna of the second wireless device, first throughput values of the first portion of data traffic while the beamforming mode is deactivated, and measure, via the single antenna of the second wireless device, second throughput values of the second portion of the data traffic while the beamforming mode is activated;
circuitry configured to generate a chart that depicts, per N degrees of rotation, the first throughput values and the second throughput values and produce a test result based on a comparison of (i) the first throughput values, (ii) the second throughput values, and (iii) one or more predetermined criteria, wherein the test result indicates whether the first wireless device passes or fails the beamforming test, wherein N is greater than 1.

13. The system of claim 12,
wherein the system is configured to rotate the first wireless device with respect to the second wireless device.

14. The system of claim 13, comprising:
circuitry to (i) measure, at the second wireless device, one or more first receive power levels during the first portion of the data traffic while the beamforming mode is deactivated, and (ii) measure, at the second wireless device, one or more second receive power levels during the second portion of the data traffic while the beamforming mode is activated, wherein the test result is based on the one or more first receive power levels and the one or more second receive power levels.

15. The system of claim 12, comprising:
circuitry configured to control, during a testing period, the first wireless device to operate at a fixed transmit rate, wherein the system is configured to rotate, at the predetermined speed during the testing period, the second wireless device with respect to the first wireless device; and
circuitry configured to control, during the testing period, a distance between the first wireless device and the second wireless device to produce a plurality of predetermined distances.

16. A method comprising:
controlling a first wireless device, under a beamforming test, to deactivate, activate, or both, a beamforming mode, wherein the first wireless device is configured to selectively use the beamforming mode to transmit data over multiple antennas to a second device;
rotating, at a predetermined speed, the first wireless device with respect to the second wireless device to produce different angles between the first wireless device and the second wireless device;
causing the first wireless device to send a first portion of data traffic to the second wireless device via a wireless channel while the beamforming mode is deactivated;
measuring, at the second wireless device, first receive power levels during the first portion of the data traffic at the different angles while the beamforming mode is deactivated;
causing the first wireless device to send a second portion of data traffic to the second wireless device via the wireless channel while the beamforming mode is activated;
measuring, at the second wireless device, second receive power levels during the second portion of the data traffic at the different angles while the beamforming mode is activated; and
producing a test result for the beamforming test based on a comparison of the first receive power values and the second receive power values,
wherein producing the test result comprises generating a chart that depicts, per N degrees of rotation, the first receive power values and the second receive power values, wherein N is greater than 1,
wherein producing the test result comprises determining whether the second receive power values are larger than the first receive power values across the different angles, and wherein producing the test result comprises determining whether the second receive power values have less power fluctuations than the first receive power values across the different angles.

17. The method of claim 16, wherein controlling the first wireless device comprises sending a command to deactivate the beamforming mode.

18. The method of claim 16, wherein one or more points on the chart represent an average of multiple receive power values.

19. The method of claim 16, comprising:
causing a test controller to display the chart to a test operator.

20. The system of claim 12, wherein one or more points on the chart represent an average of multiple throughput values.

21. The system of claim 12, comprising:
a test controller configured to display the chart to a test operator.

22. The method of claim 1, wherein one or more points on the chart represent an average of multiple throughput values.

23. The method of claim 1, comprising:
causing a test controller to display the chart to a test operator.

* * * * *